Feb. 17, 1931.  W. C. MORGAN  1,792,698
COLLAPSIBLE CAMP TABLE
Filed April 30, 1925

Inventor
William C. Morgan;
By R. S. Berry,
Attorney.

Patented Feb. 17, 1931

1,792,698

UNITED STATES PATENT OFFICE

WILLIAM C. MORGAN, OF LOS ANGELES, CALIFORNIA, ASSIGNOR TO JOHN M. LANGTON, JR., OF LOS ANGELES, CALIFORNIA

COLLAPSIBLE CAMP TABLE

Application filed April 30, 1925. Serial No. 26,936.

This invention relates to collapsible tables especially those adapted for use as camp tables and the like.

The object of the invention is to provide a light table of simple construction which shall at the same time be strong and thoroughly serviceable, which shall have greater capacity than usual in this type of table, may be partially collapsed to occupy less space when small capacity will be sufficient, and may be entirely collapsed into a minimum of space.

Briefly, the invention comprises a plurality of hingedly connected leaves with which a plurality of sets of legs are connected preferably adjacent the joint between the leaves, said leaves being braced upon and supported by said legs. Preferably the hinges which connect the leaves also serve to hingedly mount the legs, a common pintle being employed for the purpose of connecting both hinges and legs. Each hinged connection may be in the form of two hinging members respectively connected to two leaves, the pintle passing through both hinges and through the legs thereby connecting legs, hinges and leaves to form a unit. The legs of the two sets may be adjusted with respect to each other to dispose the leaves at varying angles for different kinds of work. Preferably self locking joint braces are employed to support the leaves and to truss the structure.

The invention resides further in the various combinations and arrangement of parts and features of construction ilustrated by way of example in the accompanying drawings, described herein and pointed out in the appended claims.

In the said drawings:—

Fig. 12 is a sectional detail taken on the line 12—12 of Fig. 10.

Figure 3:
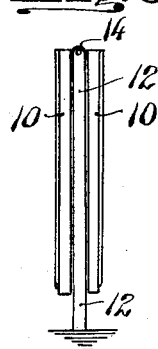
Fig. 3 is an end view of the table in collapsed position.
Figure 9:
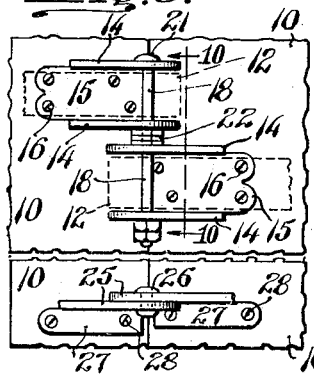
Fig. 9 is a fragmentary plan view showing the connection of the hinging members with the under sides of the table leaves.
Figure 10:
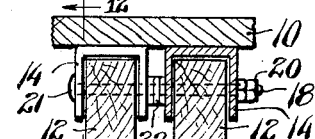
Fig. 10 is a detail taken on the line 10—10 of Fig. 9.

The table is shown as composed of two leaves 10 carried by two sets of legs 12, hinges 14 being employed for hingedly connecting the leaves 10 and also for hingedly connecting the legs 12 with said leaves 10. Each of the hinges 14 is in the form of a pair of spaced ears integral with a web 15 secured to the respective leaf 10 of the table by means of screws 16. The hinges 14 are arranged in pairs at each end of the leaves 10, the hinges of each pair being connected by means of a pintle 18 passing therethrough and also through the legs 12, a lock nut 20 being employed if necessary upon one end of the pintle while the other end may be headed as indicated at 21. The pintle 18 is spaced from the surface of the table leaves 10 a distance approximating a little more than one-half of the thickness of the legs 12 in order that when the leaves are swung to collapsed position as shown in Fig. 3, said leaves will be spaced from each other substantially the thickness of said legs whose upper ends then will be disposed between the upper edges of the collapsed leaves. The pintle 18 is disposed in vertical alignment with the joint between the leaves 10, so that said joint may be tight when the leaves are elevated, as indicated in Figs. 9 and 12. In other words, the pintle 18 is positioned to be in perpendicular alignment with the adjacent or abutting edges of said leaves. Spacing washers 22 may be used on pintles 18.

Figure 11:
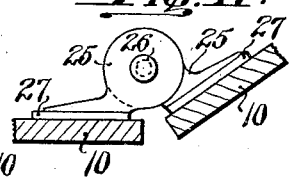
Fig. 11 is an elevation of a center hinge shown in Fig. 9.

In this manner the pintle 18 serves not only to hinge the legs 12 in the hinges 14 but also to connect the hinges 14 of the respective pair in operative alignment, and to connect the leaves 10 in operative relation. The two sets of legs and the two leaves are thus swingably connected together on a common axis. If deemed necessary to stabilize the hinged connection thus formed, an auxiliary structure shown in Figs. 9 and 11 may be employed, this structure comprising two members 25 pivoted at 26 and having bases 27 secured to the leaves 10 by means of screws 28. The pivot 26 will be disposed in longitudinal alignment with the pintles 18.

Figure 7:
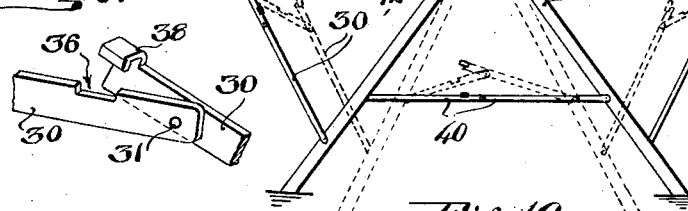
Fig. 7 is a detail of one form of lock joint used in the bracing and supporting means.

The leaves 10 are adapted to be supported by the legs 12 through the medium of braces 30, each of which comprises two members hingedly connected at 31 to form a break joint. This joint is adapted to be moved to a point slightly beyond dead center for locking the same, one form being shown in Fig. 8 wherein the end of one of the members is offset to provide an arm 32 out of alignment with the body portion thereof, said arm having a laterally offset tip 34 notched at 35 to engage over the edge of the other member of the brace. In Fig. 7 another form of locking means for the joint is disclosed wherein one of the members is notched at 36 and the other is provided with an overturned ear 38 adapted to rest in the notch 36 and lie alongside the first mentioned member, which structure will also lock the brace so that the pivot 31 will lie slightly beyond dead center.

Figure 8:
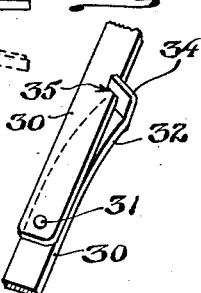
Fig. 8 is a perspective view of a modified form of joint.

The two sets of legs 12 are adapted to be held in spaced relation by means of braces 40 jointed at 31 with a lock joint construction such as shown in Fig. 7 or Fig. 8. The ends of the braces 30 are pivotally connected to the leaves and legs and the ends of the braces 40 are pivoted to the sets of legs in such manner that all of the braces may be folded inwardly towards the hinged connection of the leaves and legs. Each set of legs may be also trussed by means of bars 44, as shown in Fig. 1.

Figure 4:
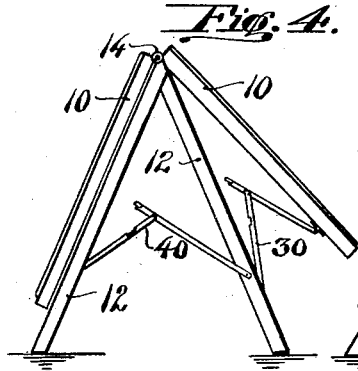
Fig. 4 is an end view showing the table in an early stage of extension.
Figure 5:
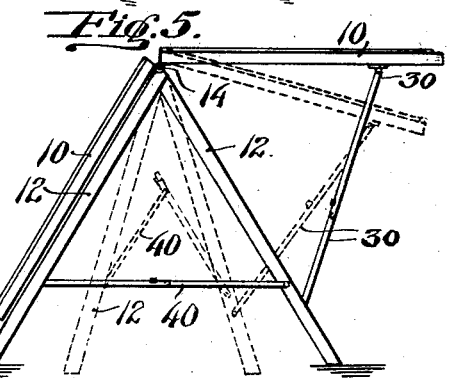
Fig. 5 is an end view showing in dotted lines and in solid lines two intermediate positions in which the table may be used.
Figure 6:
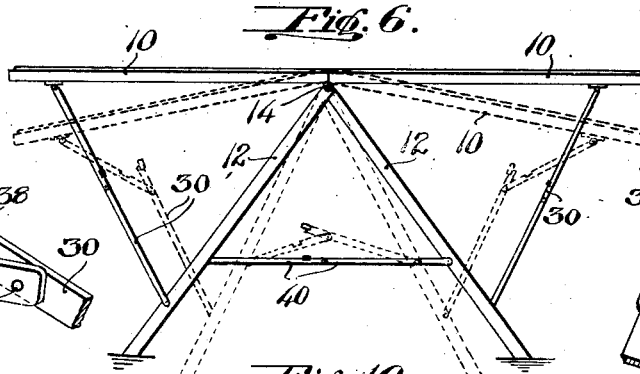
Fig. 6 is a view indicating in dotted lines both ends of the table in nearly extended form and showing the same in completely extended form in solid lines.

The method of extending the table and of collapsing the same is indicated in Figs. 4, 5 and 6. When the table is in the collapsed position shown in Fig. 3 one of the leaves 10 is grasped and pulled toward the operator to assume the position shown in Fig. 4 and at the same time one set of legs 12 may move somewhat with said leaf as indicated. This leaf is then carried up through the dotted line position shown in Fig. 6 to the full line position of said figure. The other leaf 10 is grasped and also moved to the full line position. Or if two persons wish to extend the table the two leaves 10 are moved simultaneously up through the various intermediate stages to the full line position of Fig. 6.

In this position the braces 41 will serve to maintain the two sets of legs 12 in spaced relation and the braces 30 will support the leaves 10.

Figure 1:
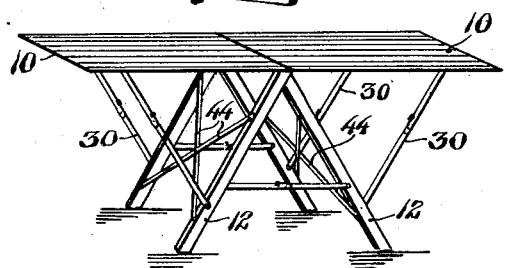
Fig. 1 is a perspective view of a collapsible table of the present invention in extended or operative position.
Figure 2:
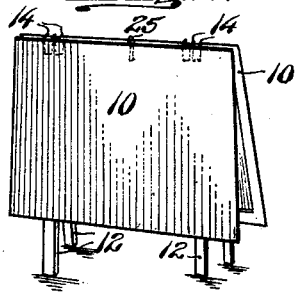
Fig. 2 is a perspective view of the table in nearly collapsible position, whereby the same might serve as a black board or sign board.

When in the full line position of Figs. 1 and 6 the table presents its maximum capacity for ordinary use. If less capacity is required in the table and it is desired to occupy less space, the leaf 10 at the left may be lowered as shown in Fig. 5, allowing the leaf at the right to remain in position for service wherein the table may serve, for example, as a writing desk. If desired the joints in the braces 40 may be broken and the legs moved to the dotted line position of Fig. 5, supporting braces 30 for the elevated leaf being allowed to remain straight, in which position the elevated leaf will assume an inclined position and may serve as a drawing table. Or both of the leaves 10 might be moved to the dotted line position shown in Fig. 6 and allowing the braces 30 to remain straight for supporting said leaves. By collapsing the leaves to the position shown in Fig. 2 the device might be used as a sign board or the like.

It will be apparent from Fig. 3 that, when the table is fully collapsed, one set of legs is between the other legs, the two sets thus together forming a table support, which extends substantially in one plane and thereby causes the collapsed table to occupy a minimum of space, while from Figs. 1 and 6 it will be clear that, when the table is fully extended, a large table surface may be had. The use of a combination hinge for both the legs and the leaves results in a folding table which is complete in one unit, it not being necessary to remove or separate any of the parts in order to collapse the table. When the table is completely folded, as shown in Fig. 3, the braces 30 and 40 lie along side the legs 12 thus allowing them to extend substantially parallel to each other and in approximate contact with the sides of the legs. On a smaller scale, the device might also be used as a chair or stool.

I claim:

A collapsible table comprising a pair of table leaves hinged to each other along one edge, the hinges comprising depending perforated brackets carried by each leaf, each of said brackets projecting beyond the edge of said leaf and laterally offset with respect to each other to overlap, two pairs of supporting legs, the upper ends of one pair offset with respect to the other pair to overlap, said overlapped portions disposed adjacent said offset hinge brackets, hinge pintles extending through said hinge brackets and through said overlapped portions and braces adjacent the lower ends of said legs to support the free ends of said top leaves.

WM. C. MORGAN.